United States Patent
Falkinger et al.

(10) Patent No.: US 7,185,444 B2
(45) Date of Patent: Mar. 6, 2007

(54) MODULAR SCANNING UNIT OF A POSITION MEASURING SYSTEM

(75) Inventors: Bernhard Falkinger, Nussdorf (DE); Horst Gschossmann, Tüssling (DE); Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/873,690

(22) Filed: Jun. 22, 2004

(65) Prior Publication Data

US 2004/0261283 A1 Dec. 30, 2004

(30) Foreign Application Priority Data

Jun. 30, 2003 (DE) .............. 103 29 374

(51) Int. Cl.
*G01D 21/00* (2006.01)
(52) U.S. Cl. .............. 33/707; 33/706; 33/708
(58) Field of Classification Search .......... 33/706–708, 33/1 N, 1 PT
See application file for complete search history.

(56) References Cited

U.S. PATENT DOCUMENTS

| | | | | |
|---|---|---|---|---|
| 3,708,681 A | * | 1/1973 | Ivers ............................ | 33/707 |
| 3,816,002 A | | 6/1974 | Wieg | |
| 4,461,083 A | * | 7/1984 | Ernst ............................ | 33/707 |
| 4,477,189 A | * | 10/1984 | Ernst ............................ | 356/619 |
| 4,479,716 A | * | 10/1984 | Nelle ............................ | 33/707 |
| 4,564,294 A | * | 1/1986 | Ernst ............................ | 33/707 |
| 4,593,194 A | | 6/1986 | Graham et al. | |
| 4,606,642 A | * | 8/1986 | Nelle ............................ | 33/707 |
| 4,607,956 A | * | 8/1986 | Ishihara et al. ............... | 33/707 |
| 4,628,201 A | * | 12/1986 | Schmitt ....................... | 33/707 |
| 4,840,488 A | * | 6/1989 | Kabaya et al. ................ | 33/707 |
| 5,038,491 A | * | 8/1991 | Tsukiji et al. ................. | 33/702 |
| 5,229,836 A | * | 7/1993 | Nagano ....................... | 33/707 |
| 5,258,931 A | * | 11/1993 | Hassler, Jr. .................. | 33/707 |
| 5,283,434 A | | 2/1994 | Ishizuka et al. | |
| 5,583,798 A | * | 12/1996 | Franz et al. .................. | 33/707 |
| 5,651,187 A | * | 7/1997 | Affa ............................ | 33/706 |
| 5,739,911 A | * | 4/1998 | Holzapfel et al. ........... | 356/620 |
| 6,470,577 B1 | * | 10/2002 | Tondorf et al. ............. | 33/1 PT |
| 2002/0133964 A1 | * | 9/2002 | Steinich et al. .............. | 33/708 |
| 2004/0245442 A1 | * | 12/2004 | Gruber et al. ........ | 250/231.13 |
| 2005/0046413 A1 | * | 3/2005 | Schmidt et al. ............ | 324/164 |
| 2005/0076527 A1 | * | 4/2005 | Mauermann ................. | 33/706 |

FOREIGN PATENT DOCUMENTS

EP 0 548 848 A1 6/1993

* cited by examiner

*Primary Examiner*—Yaritza Guadalupe McCall
(74) *Attorney, Agent, or Firm*—Brinks Hofer Gilson & Lione

(57) ABSTRACT

A modular scanning unit for a position measuring system and including a support having a recess with a guide surface and a holder adjustably supported upon the support, wherein the holder has a light source and a beam-shaping device aligned with the light source. A scanning plate aligned with the light source and the beam-shaping device. The holder is guided upon the guide surface, displaceable in a first direction and rotatable in all directions, and the holder rests against the guide surface at at least one point, and that, following adjustment, the holder is fixed in place at the at least one point.

29 Claims, 6 Drawing Sheets

MODULAR SCANNING UNIT OF A POSITION MEASURING SYSTEM

Applicants claim, under 35 U.S.C. §119, the benefit of priority of the filing date of Jun. 30, 2003 of a German patent application, copy attached, Serial Number 103 29 374.4, filed on the aforementioned date, the entire contents of which is incorporated herein by reference.

BACKGROUND OF THE INVENTION

1. Field of the Invention

The present invention relates to a modular scanning unit of a position measuring system for the photoelectric scanning of a scale at a fixed distance, having a support on which a holder can be adjusted.

2. Discussion of Related Art

A modular scanning unit in accordance with the species for the photoelectric scanning of a scale is described in U.S. Pat. No. 4,593,194, the entire contents of which are incorporated herein by reference. The modular scanning unit includes a holder, on which a light source, a lens, a scanning plate, as well as a detector array are fastened and aligned with each other. Such a holder can be produced relatively simply, and the structural elements attached to it can be fastened in an automated manner.

For the correct scanning of the scale it is necessary that the scanning distance of the scanning plate with respect to the scale is exactly set as a function of the grating parameters. It is furthermore necessary that the angular position of the scanning grating of the scanning plate is set in accordance with the requirements to match the graduations of the scale grating.

In accordance with U.S. Pat. No. 4,593,194, the holder is provided with a tube-shaped extension piece for this purpose, which is pushed onto a cylindrical trunnion as the support. The holder can be displaced on the trunnion, by which the scanning distance can be set, and the holder is furthermore rotatable around the trunnion in a horizontal plane, by which the setting of the moiré angle is made possible. After it has been set, the holder is fixed in place on the trunnion by clamping.

With this embodiment it is disadvantageous that the trunnion only permits a rotation in the horizontal plane and that moreover the extension piece increases the structural size of the modular scanning unit.

A modular scanning unit of a linear measuring device is represented in FIGS. 13A and 13C of EP 0 548 848 A, wherein a structural group including a light source, a lens, as well as a grating in a recess of a support, is freely adjustable with respect to further structural elements of the modular scanning unit. After an adjustment has been made, the modular group is clamped to the support by screws and is additionally secured by an adhesive.

The positive fixation by screws within the recess is elaborate and as a rule results in the loss of the adjustment. Furthermore, the gluing gaps for the adhesive are relatively large, which has negative effects on the sturdiness and long range stability.

OBJECT AND SUMMARY OF THE INVENTION

It is therefore an object of the present invention to create a modular scanning unit which makes a miniaturized structural shape possible and allows a flexible adjustment, and wherein, following their adjustment, the structural components are permanently stable and easy to fix in place.

This object is attained by a modular scanning unit for a position measuring system and including a support having a recess with a guide surface and a holder adjustably supported upon the support, wherein the holder has a light source and a beam-shaping device aligned with the light source. A scanning plate aligned with the light source and the beam-shaping device. The holder is guided upon the guide surface, displaceable in a first direction and rotatable in all directions, and the holder rests against the guide surface at at least one point, and that, following adjustment, the holder is fixed in place at the at least one point.

Further advantages, as well as details, of the present invention are represented in the following description of exemplary embodiments by the drawings.

DETAILED DESCRIPTION OF THE PREFERRED EMBODIMENTS

An exemplary embodiment of the present invention will be described by FIGS. 1 to 7. The present invention will be explained by a linear measuring system, but can also be analogously employed in connection with an angle measuring system.

Figure 1:
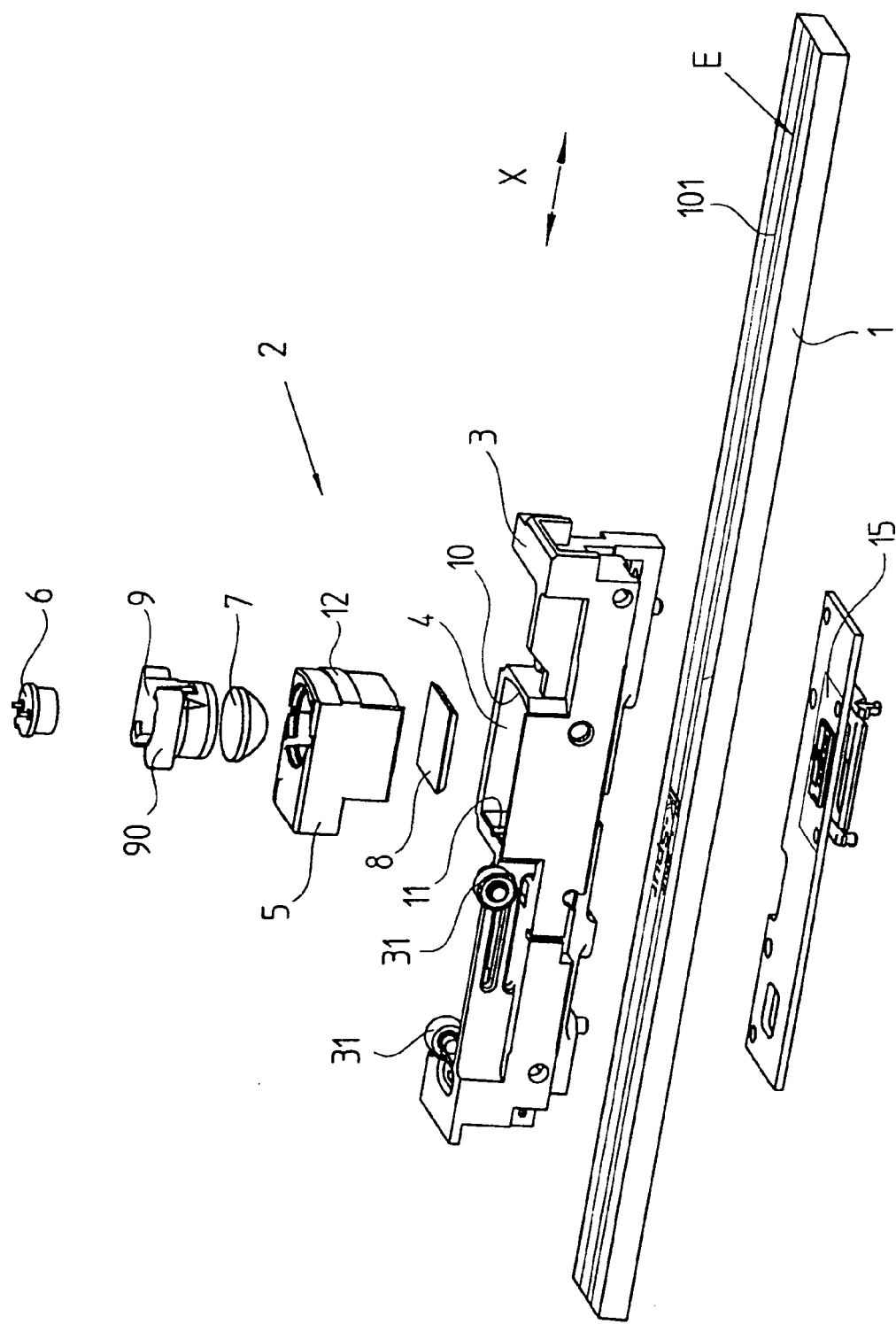
FIG. 1 shows an exploded view of an embodiment of a linear measuring system with an embodiment of a modular scanning unit in accordance with the present invention.
Figure 2:
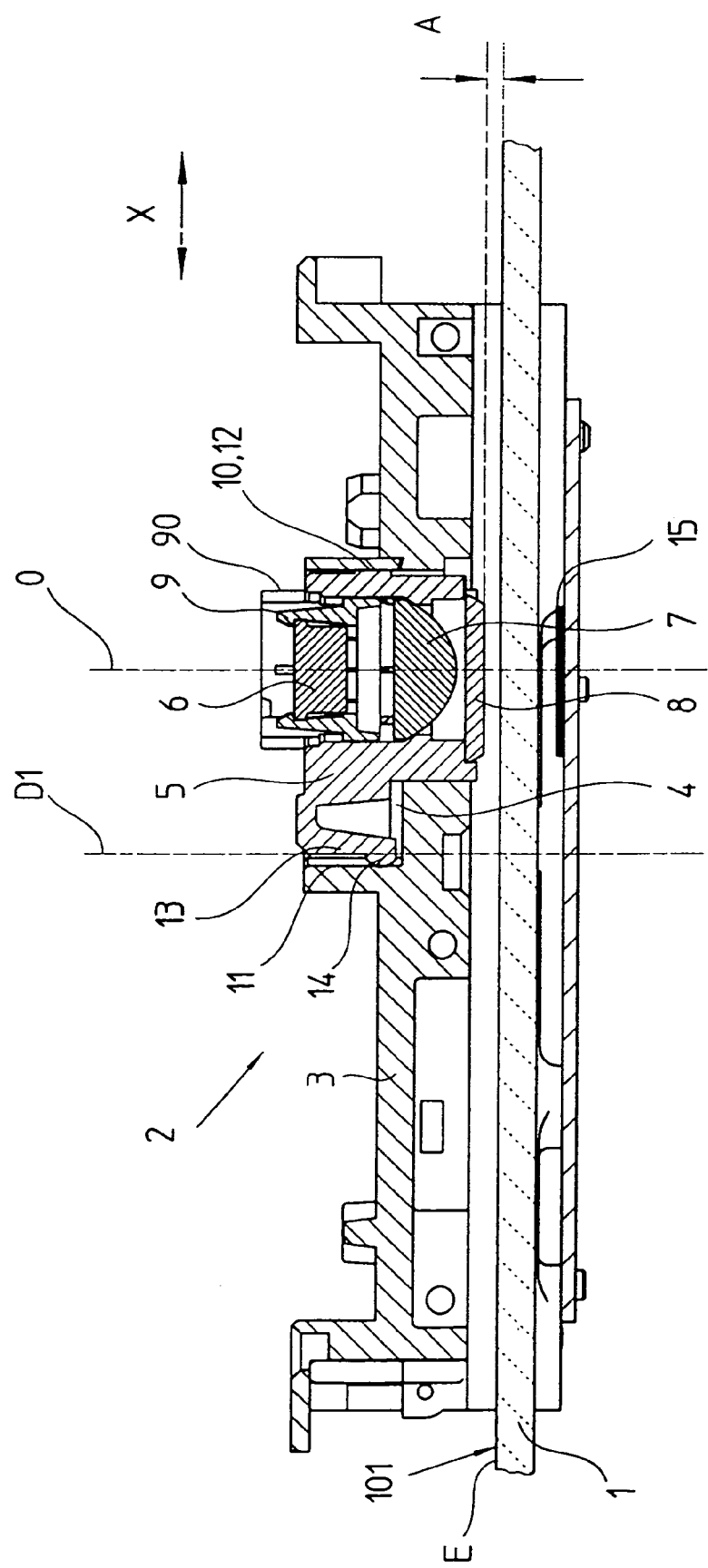
FIG. 2 shows the linear measuring system in accordance with FIG. 1 in the assembled state in longitudinal section.

FIG. 1 shows a spatial exploded view of the linear measuring system embodied in accordance with the present invention, and FIG. 2 shows this linear measuring system in the assembled state. This linear measuring system includes a linear scale 1 with a measuring graduation 101, as well as a modular scanning unit 2, which can be displaced in the measuring direction X relative to the scale 1 for position measuring. In the course of the relative displacement, the modular scanning unit 2 scans the scale 1 photoelectrically in a known manner and generates position-dependent electric scanning signals for positioning two structural components which can be displaced in relation to each other, wherein the structural components on which the linear measuring system has been installed can be of any arbitrary type. For example, they can be structural components of a machine tool, an electric motor or a lithographic apparatus. The measuring graduation 101 can here be an incremental, or a single- or multi-track absolutely coded pattern.

For an exact position measurement it is necessary that the modular scanning unit 2 scans the measuring graduation 101 of the scale 1 at a fixed constant scanning distance A. To assure this, the modular scanning unit 2 is guided, exactly parallel with respect to the scale 1 in the measuring direction X, on sliding elements or rolling elements 31 in a known manner on the scale 1 itself, or on a support of the scale 1.

The scanning unit 2 includes a support 3 with a recess 4 for the adjustable reception of a holder 5. A light source 6, a lens 7 as the beam-shaping device, and a scanning plate 8 are mounted, aligned with each other, on the holder 5. For automated mounting of the light source 6, the latter can be snapped into a socket 9, which in turn is fastened on the holder 5. In place of a lens 7 it is also possible to employ a beam-shaping device in the form of a lens array or a Fresnel lens.

Surfaces 10, 11 of the recess 4 constitute a guide, along with the holder 5 can be slidingly displaced in the direction of the scanning distance A, i.e. vertically with respect to the plane E of the measuring graduation 101 to be scanned. One of these guide surfaces 10 is a cylinder surface which, on the one hand, extends parallel with respect to the direction of the scanning distance A, and on the other hand is curved in the shape of an arc of a circle, wherein the axis of the arc of the circle extends parallel in the direction of the scanning distance A. A correspondingly curved surface 12 of the holder 5 rests against this guide surface 10 of the support 3. This surface 12 is a convexly curved cylinder face with a radius of curvature corresponding to the guide surface 10, as represented in an enlargement in FIG. 5.

A spring element 13 (FIG. 6) is arranged on the holder 5 opposite the curved cylindrical surface 12 for urging the surface 12 of the holder 5 free of play against the guide surface 10 of the support 3. This spring element 13 is a resilient tongue, which is formed on the holder 5 and has a ball-shaped protrusion 14 formed on it for the resilient support on a further guide surface 11 of the recess 4 in the support 3. This further guide surface 11 is a V- or U-shaped groove 11 extending in the direction of the scanning distance A and constituting a linear guide for the protrusion 14. Therefore the protrusion 14 is a guide element for the holder 5.

The holder 5 is also embodied for adjusting the angular position in relation to the scale 1 by being rotatable in the recess in all directions, i.e. around all three axes of rotation. In the exemplary embodiment represented, the adjustment of the Moiré angle, i.e. the turning of the holder in a plane parallel with the plane E and extending around an axis of rotation D1 parallel with the scanning distance A, is possible in a particularly exact manner. In the course of this the scanning graduation 801, represented in FIG. 7, of the scanning plate 8 is aligned with respect to the measuring graduation 101. The axis of rotation D1 runs through the center of the ball-shaped protrusion 14 and is arranged distant from the optical axis O of the lens 7, by which a reduction of the pivot movement is achieved. Thus, the radius of curvature of the arc of a circle of the guide surface 10 of the support 3 is greater than the distance between the optical axis O and this guide surface 10. The radius of curvature of the surface 12 corresponds at least to a large extent to the distance between the center of the protrusion 14 and the guide surface 10 on the support 3. The surface 12 is curved at least in the represented manner, but it can additionally also be curved in other directions, it can in particular have a spherical surface of a radius corresponding to the distance to the axis of rotation D1. However, deviations from this target radius are non-critical since, on the one hand, it is assured by the spring element 13 that the protrusion 14 remains in prestressed contact with the groove 11 and, on the other hand, the curved surface 12 remains at least partially in contact with the guide surface 10.

Thus, in every adjusting position the holder 5 touches the support 3 within the recess 4 at several points 111, 112, 113. After the adjustment is completed, these points 111, 112, 113 allow a force-free, but yet stable attachment, or fixation, of the holder 5 on the support 3 by a material-to-material connection or adhesive bond, in particular soldering, gluing or by welding. With gluing it is assured that no, or only slight, gluing gaps are created. This has the advantage that swelling, which is inherent in the adhesives, cannot cause a loss of the adjustment. Welding or fusion, especially welding by a laser beam, can be employed particularly advantageously if the holder 5 and the support 3 are made of plastic, for example glass-fiber reinforced polycarbonate.

Figure 3:
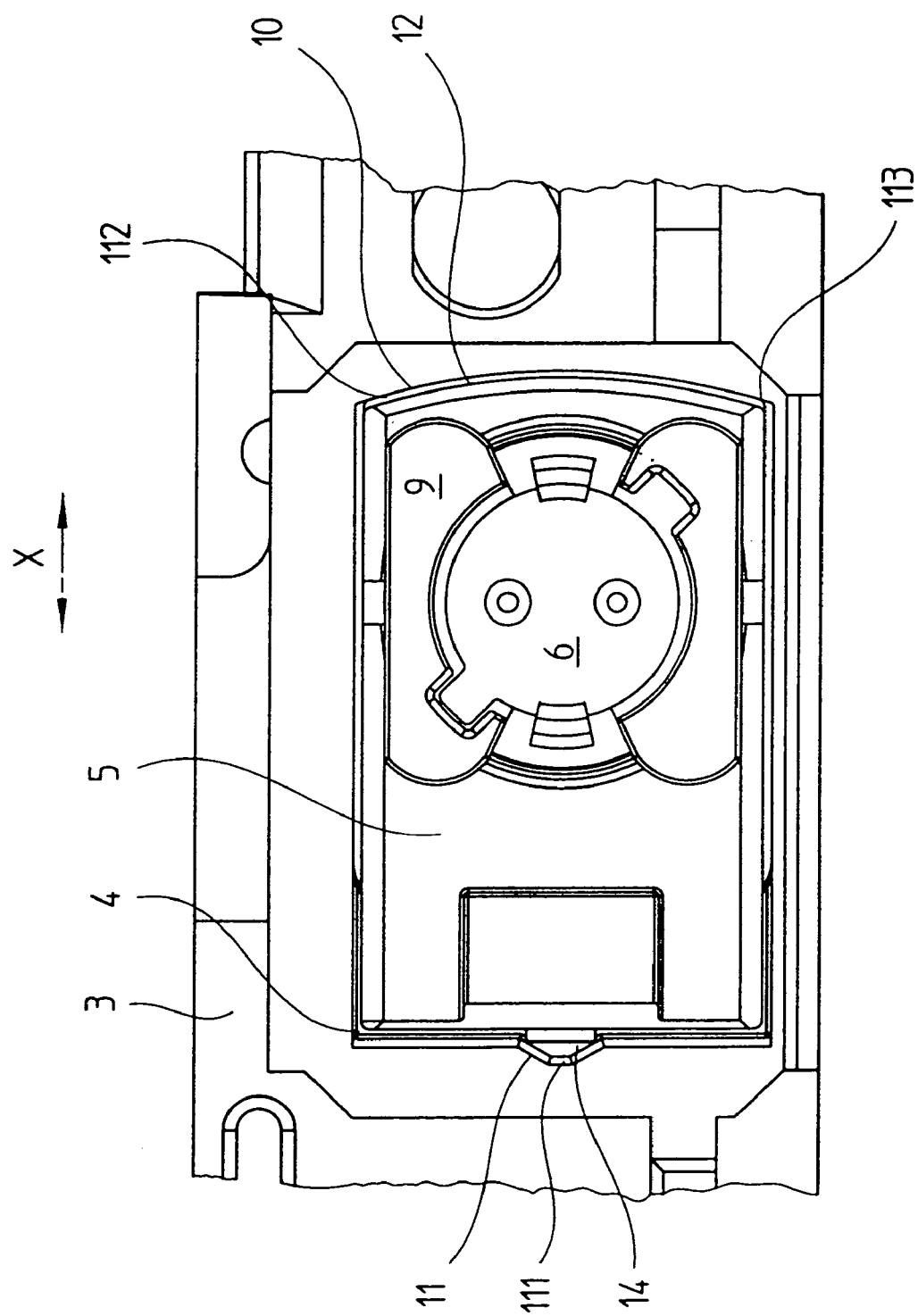
FIG. 3 shows the area of the modular scanning unit of the linear measuring system of FIG. 1 in a view from above.
Figure 4:
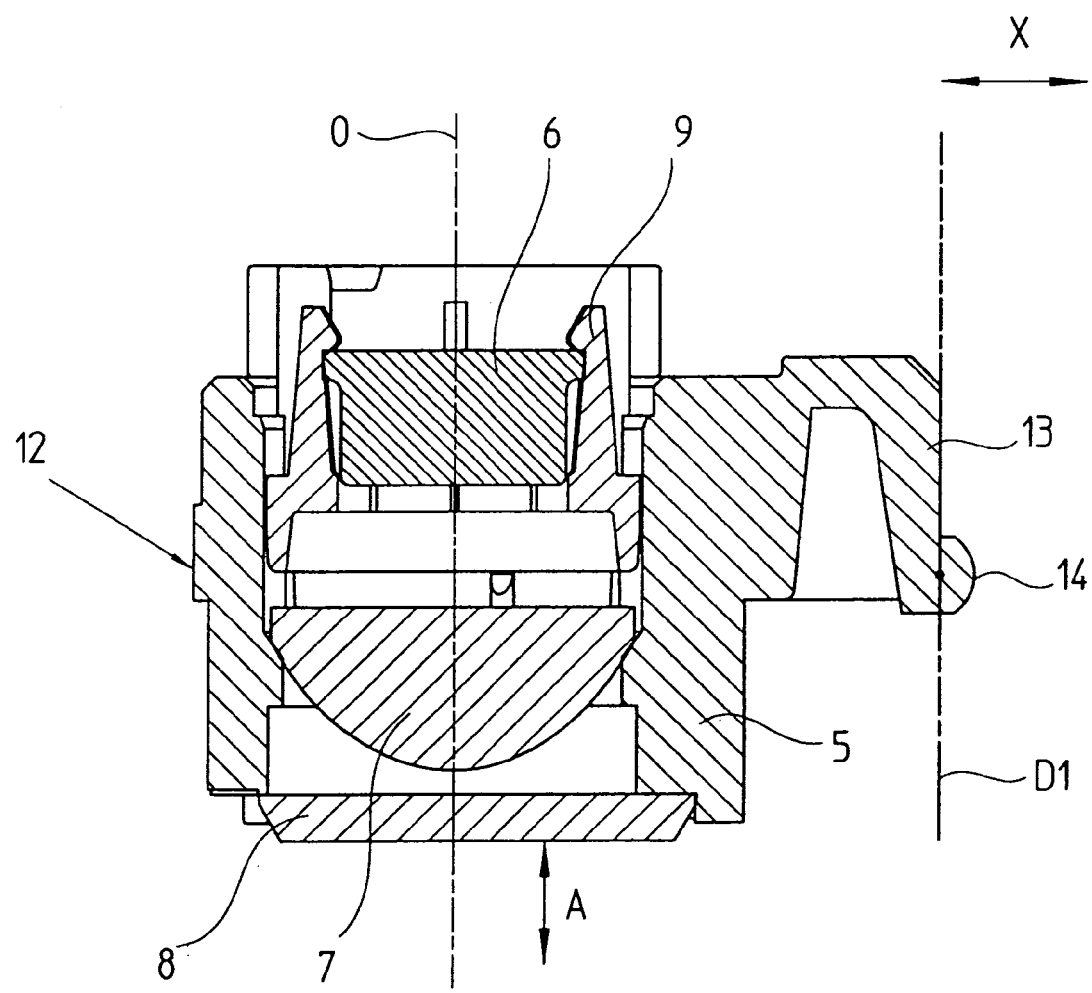
FIG. 4 represents an embodiment of a holder of the modular scanning unit of FIG. 1 in an enlarged longitudinal section in accordance with the present invention.
Figure 5:
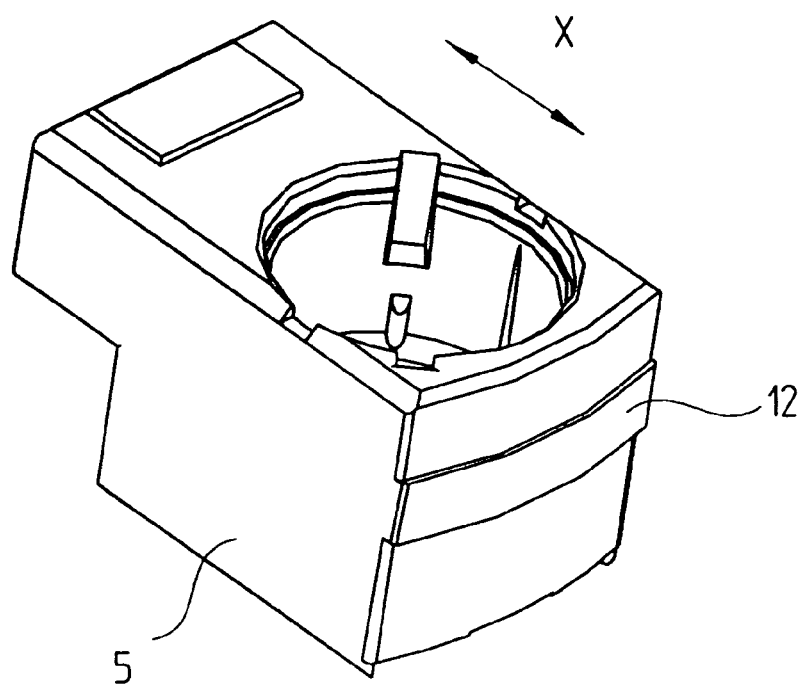
FIG. 5 shows a first perspective plan view of the holder of FIG. 4.
Figure 6:
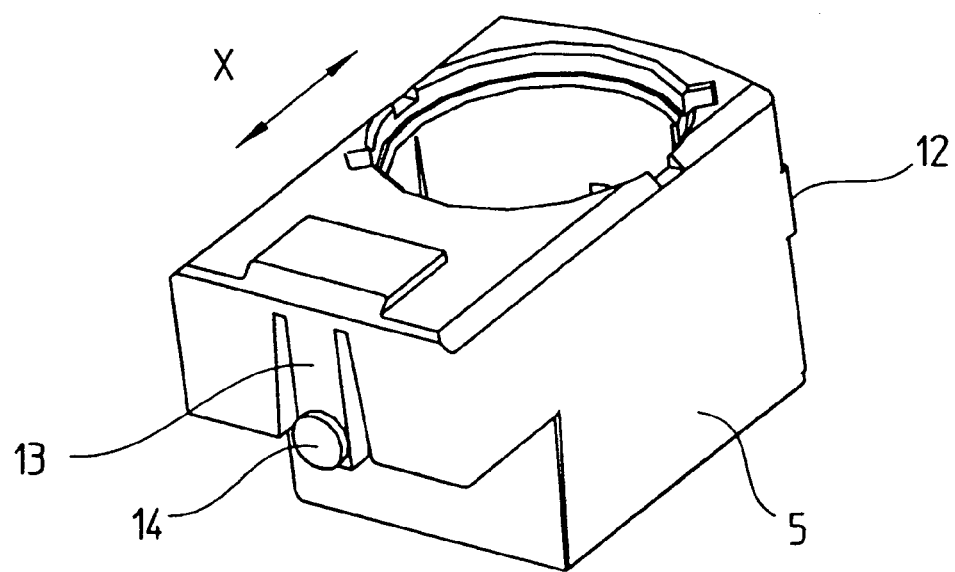
FIG. 6 shows a second perspective plan view of the holder of FIG. 4.
Figure 7:
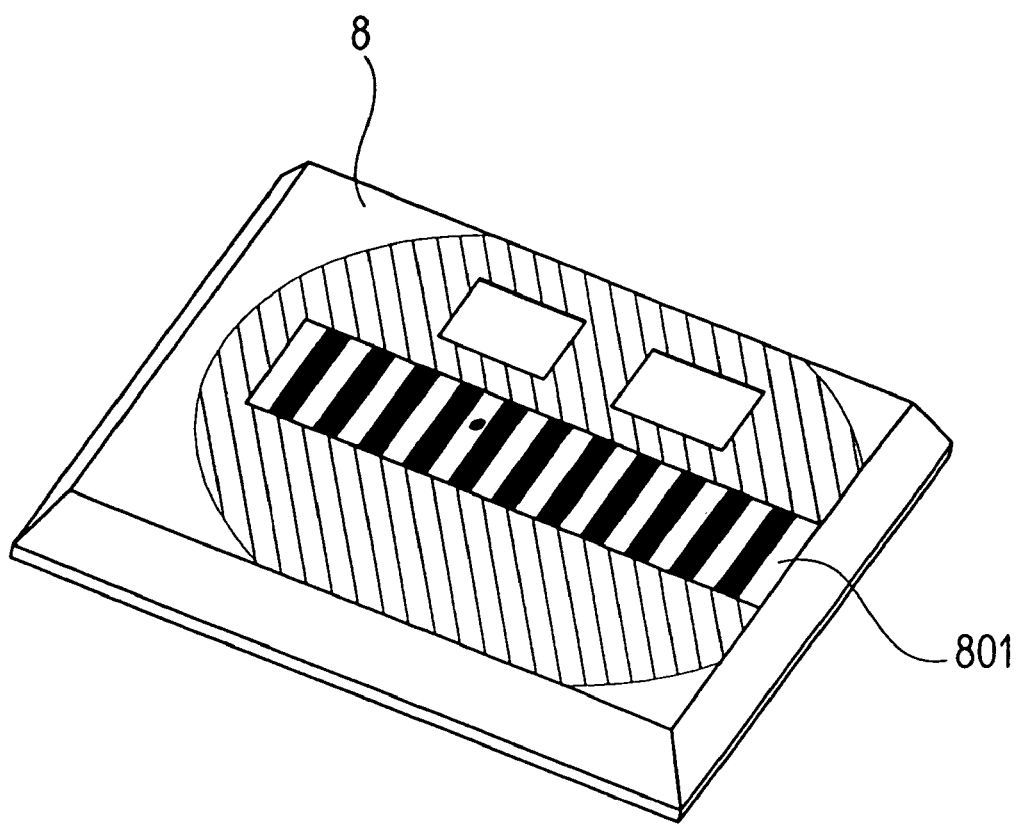
FIG. 7 shows an embodiment of a scanning plate to be used with the linear measuring system and modular scanning unit of FIG. 1.

As already explained, in every adjusting position the holder 5 touches the support 3 within the recess 4 at several points 111, 112, 113. These points 111, 112, 113 are advantageously spatially distributed on the circumference of the recess 4, as shown in FIG. 3. The term point includes lines as well as surface areas, so that a material-to-material connection or adhesive bond takes place at surface areas 111, 112, 113 which are spaced apart from each other.

The described adjustment of the holder 5 in the recess 4 of the support 3 takes place in particular in that the holder 5 has engagement surfaces 90 for an adjusting tool, which are engaged by the tool. The adjusting tool is, in particular, a manipulator (robot), controlled as a function of the instantaneous scanning signals from the detector unit 15, which encloses the holder 5 at the engagement surfaces 90. The engagement surfaces 90 project out of the recess 4 of the support 3 for this purpose.

In the example shown, a detector unit 15 is fastened on the support 3. This detector unit 15 can be a printed circuit board with photo-receivers. Alternatively it can be embodied as a structured detector array, in which case the detector array then simultaneously constitutes the scanning plate. In a way not represented, the detector unit 15 can also be mounted on the holder 5.

Further exemplary embodiments exist within the scope of the present invention besides the described examples.

We claim:

1. A modular scanning unit for scanning a scale of a position measuring system comprising:
   a support having a recess with a guide surface;
   a holder adjustably supported upon said support, said holder comprising:
      a light source;
      a beam-shaping device aligned with said light source;
      a scanning plate aligned with said light source and said beam-shaping device;
   wherein said holder is guided upon said guide surface, displaceable in a first direction oriented along a scanning gap defined between said scanning plate and said scale and rotatable in said recess in all directions, and said holder rests against said guide surface at at least one point, and that, following adjustment, said holder is fixed in place at said at least one point.

2. The modular scanning unit in accordance with claim 1, wherein said holder is fixed in place on said support at said at least one point by a non-mechanical material-to-material contact.

3. The modular scanning unit in accordance with claim 2, wherein said material-to-material contact is an adhesive bond.

4. The modular scanning unit in accordance with claim 2, wherein said material-to-material contact is selected from the group consisting of glue, a weld or solder.

5. The modular scanning unit in accordance with claim 2, wherein said holder and said support are each made of plastic, and said holder is welded to said support at said at least one point.

6. The modular scanning unit in accordance with claim 1, wherein said holder rests under prestress against said guide surface.

7. The modular scanning unit in accordance with claim 6, wherein said prestress is caused by a spring element arranged on said holder.

8. The modular scanning unit in accordance with claim 1, wherein said guide surface is curved in the shape of a circle, wherein an axis of an arc of said circle extends parallel with respect to said direction and said axis constitutes an axis of rotation, around which said holder is rotated.

9. The modular scanning unit in accordance with claim 8, wherein said beam-shaping device comprises a lens with an optical axis, and a radius of said arc of said circle is greater than a distance between said optical axis and said guide surface.

10. The modular scanning unit in accordance with claim 8, wherein said holder comprises a surface, resting on said guide surface, which has a curvature that is identical to a curvature of said guide surface.

11. The modular scanning unit in accordance with claim 8, wherein said support comprises a second guide surface that is constituted by a groove extending along said direction, into which a guide element of said holder is introduced.

12. The modular scanning unit in accordance with claim 11, wherein said guide element is prestressed by a spring element arranged on said holder.

13. The modular scanning unit in accordance with claim 11, wherein said guide element comprises a spherically curved surface, whose center of curvature extends through said axis of rotation.

14. The modular scanning unit in accordance with claim 1, wherein said guide surface extends parallel with said direction and in this way forms a cylinder surface.

15. The modular scanning unit in accordance with claim 14, wherein said beam-shaping device comprises a lens with an optical axis, and a radius of said arc of said circle is greater than a distance between said optical axis and said guide surface.

16. A position measuring system comprising:
a scale;
a modular scanning unit that is positioned a fixed distance from said scale, said scanning unit comprising:
  a support having a recess with a guide surface;
  a holder adjustably supported upon said support, said holder comprising:
    a light source;
    a beam-shaping device aligned with said light source;
  a scanning plate aligned with said light source and said beam-shaping device;
  wherein said holder is guided upon said guide surface, displaceable in a first direction oriented along a scanning gap defined between said scanning plate and said scale and rotatable in said recess in all directions, and said holder rests against said guide surface at at least one point, and that, following adjustment, said holder is fixed in place at said at least one point.

17. The position measuring system in accordance with claim 16, wherein said holder is fixed in place on said support at said at least one point by a non-mechanical material-to-material contact.

18. The position measuring system in accordance with claim 17, wherein said material-to-material contact is an adhesive bond.

19. The position measuring system in accordance with claim 17, wherein said holder and said support are each made of plastic, and said holder is welded to said support at said at least one point.

20. The position measuring system in accordance with claim 17, wherein said guide surface is curved in the shape of a circle, wherein an axis of an arc of said circle extends parallel with respect to said direction and said axis constitutes an axis of rotation, around which said holder is rotated.

21. The position measuring system in accordance with claim 20, wherein said beam-shaping device comprises a lens with an optical axis, and a radius of said arc of said circle is greater than a distance between said optical axis and said guide surface.

22. The position measuring system in accordance with claim 20, wherein said holder comprises a surface, resting on said guide surface, which has a curvature that is identical to a curvature of said guide surface.

23. The position measuring system in accordance with claim 20, wherein said support comprises a second guide surface that is constituted by a groove extending along said direction, into which a guide element of said holder is introduced.

24. The position measuring system in accordance with claim 23, wherein said guide element is prestressed by a spring element arranged on said holder.

25. The position measuring system in accordance with claim 23, wherein said guide element comprises a spherically curved surface, whose center of curvature extends through said axis of rotation.

26. The position measuring system in accordance with claim 17, wherein said guide surface extends parallel with said direction and in this way forms a cylinder surface.

27. The position measuring system in accordance with claim 26, wherein said beam-shaping device comprises a lens with an optical axis, and a radius of said arc of said circle is greater than a distance between said optical axis and said guide surface.

28. The position measuring system in accordance with claim 16, wherein said holder rests under prestress against said guide surface.

29. The position measuring system in accordance with claim 28, wherein said prestress is caused by a spring element arranged on said holder.

* * * * *